May 2, 1950 E. WODETZKY 2,505,815
SHAPING MACHINE
Filed April 24, 1947 8 Sheets-Sheet 1
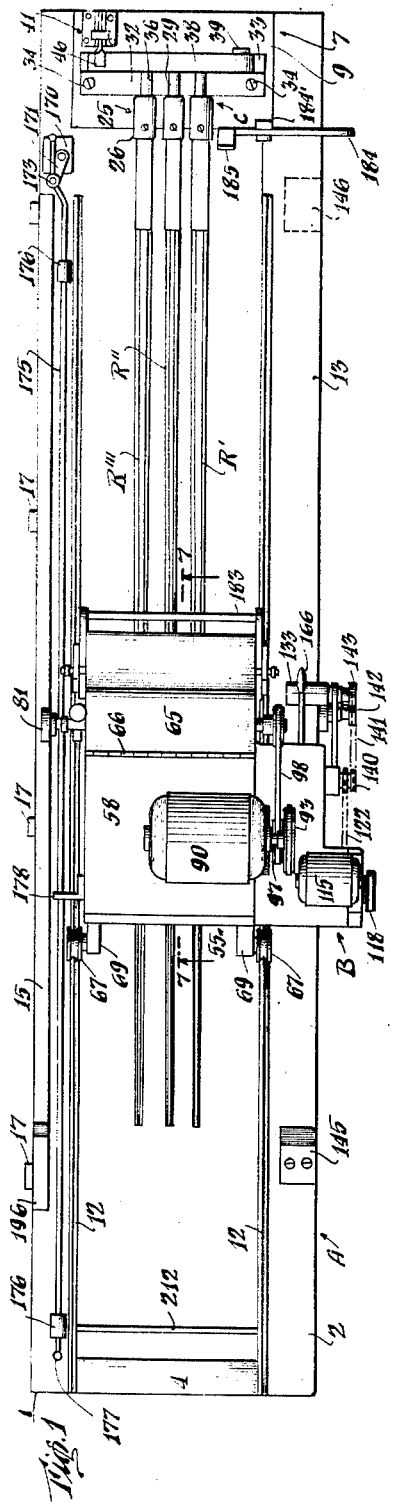
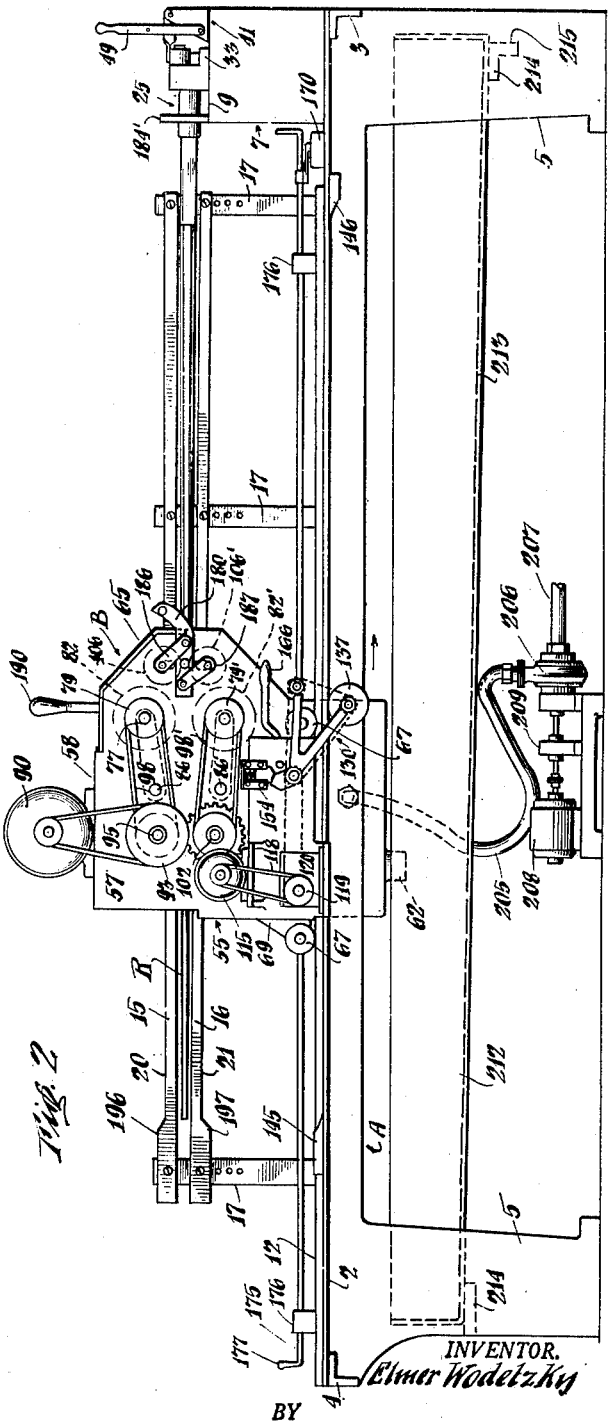
INVENTOR.
Elmer Wodetzky
BY
Austin, Wilhelm & Carlson
ATTORNEYS May 2, 1950        E. WODETZKY        2,505,815
SHAPING MACHINE
Filed April 24, 1947                          8 Sheets—Sheet 2
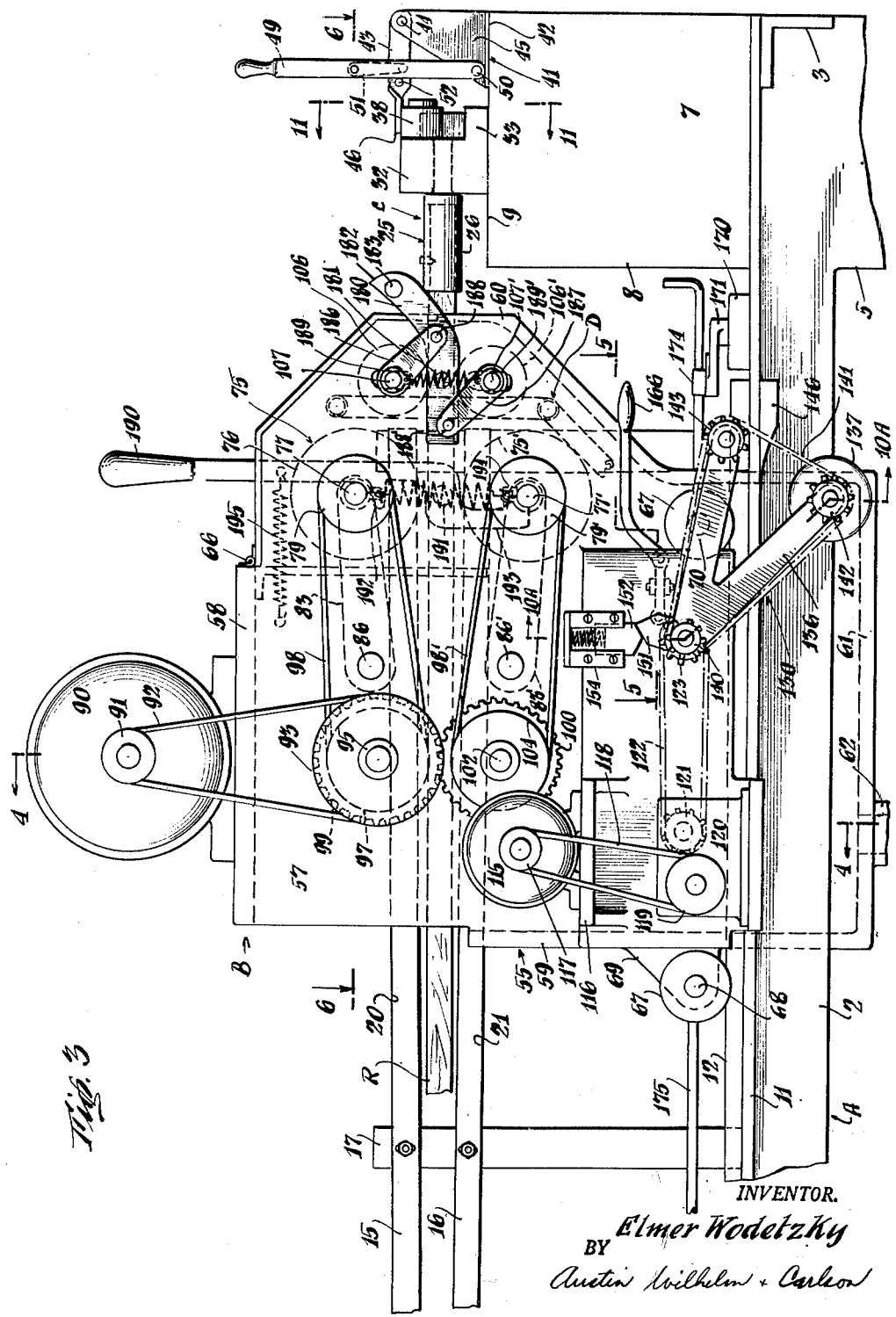
INVENTOR.
Elmer Wodetzky
BY
Austin Wilhelm & Carlson
ATTORNEYS

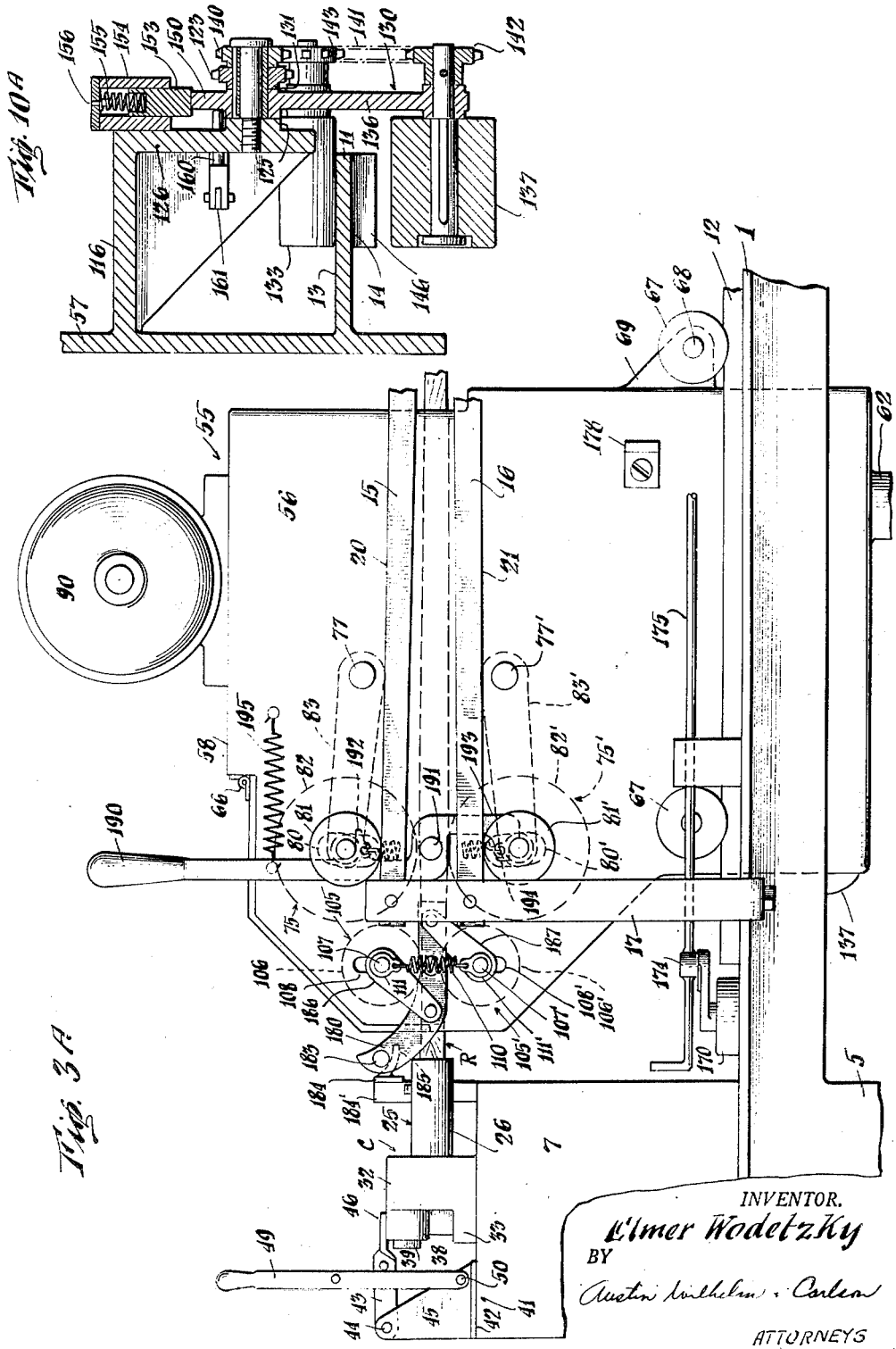

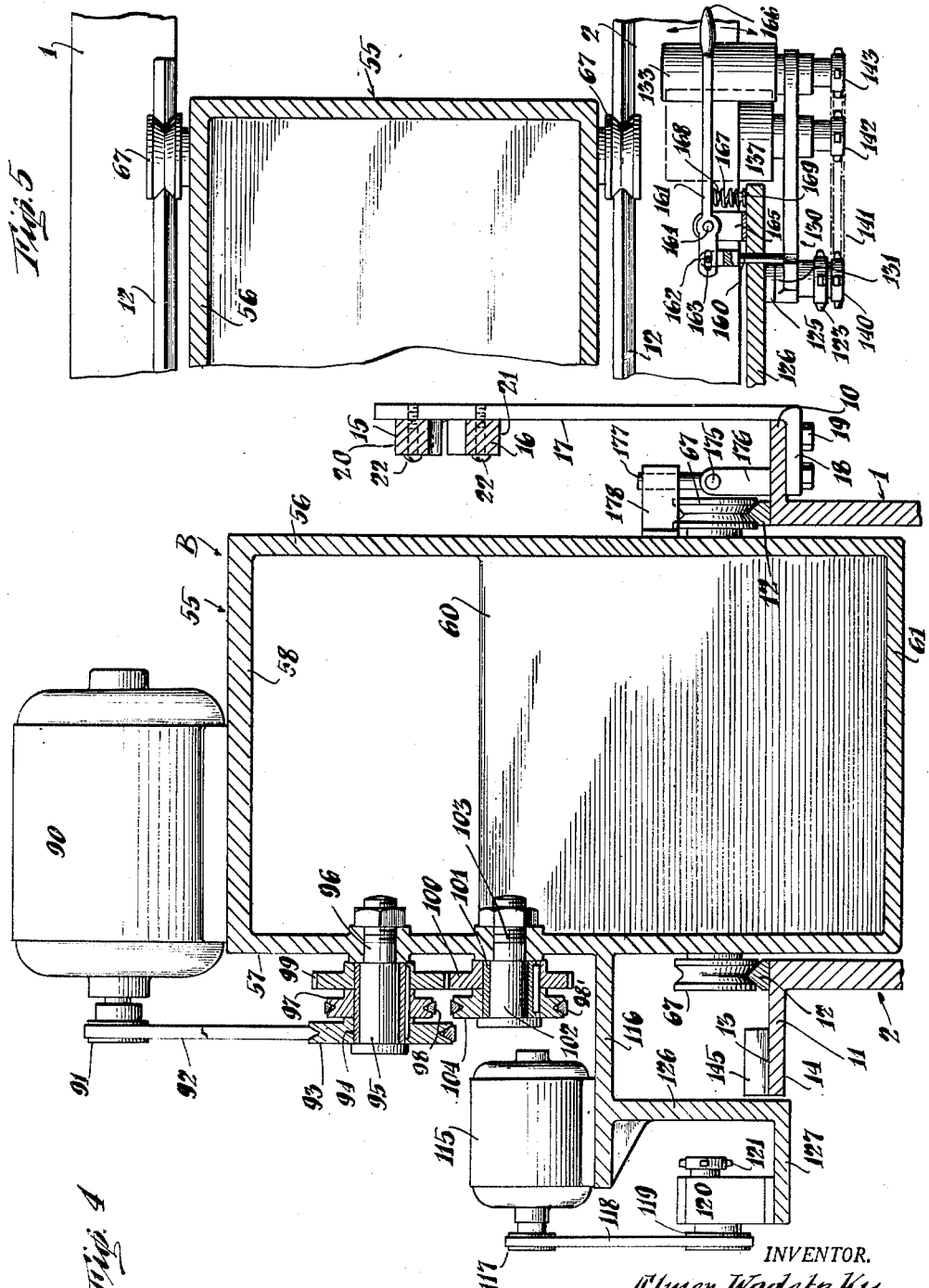

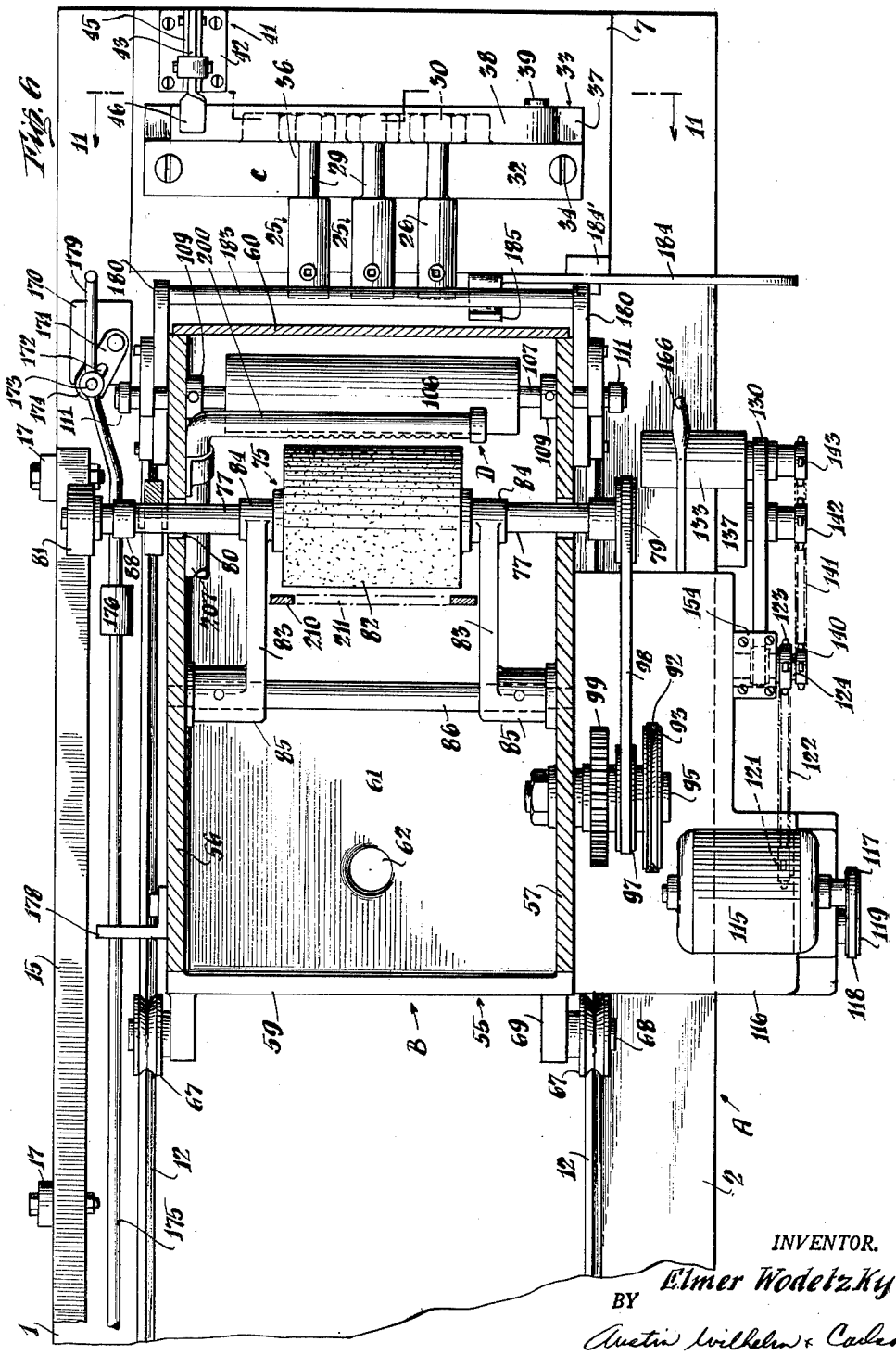

May 2, 1950   E. WODETZKY   2,505,815
SHAPING MACHINE
Filed April 24, 1947   8 Sheets-Sheet 6
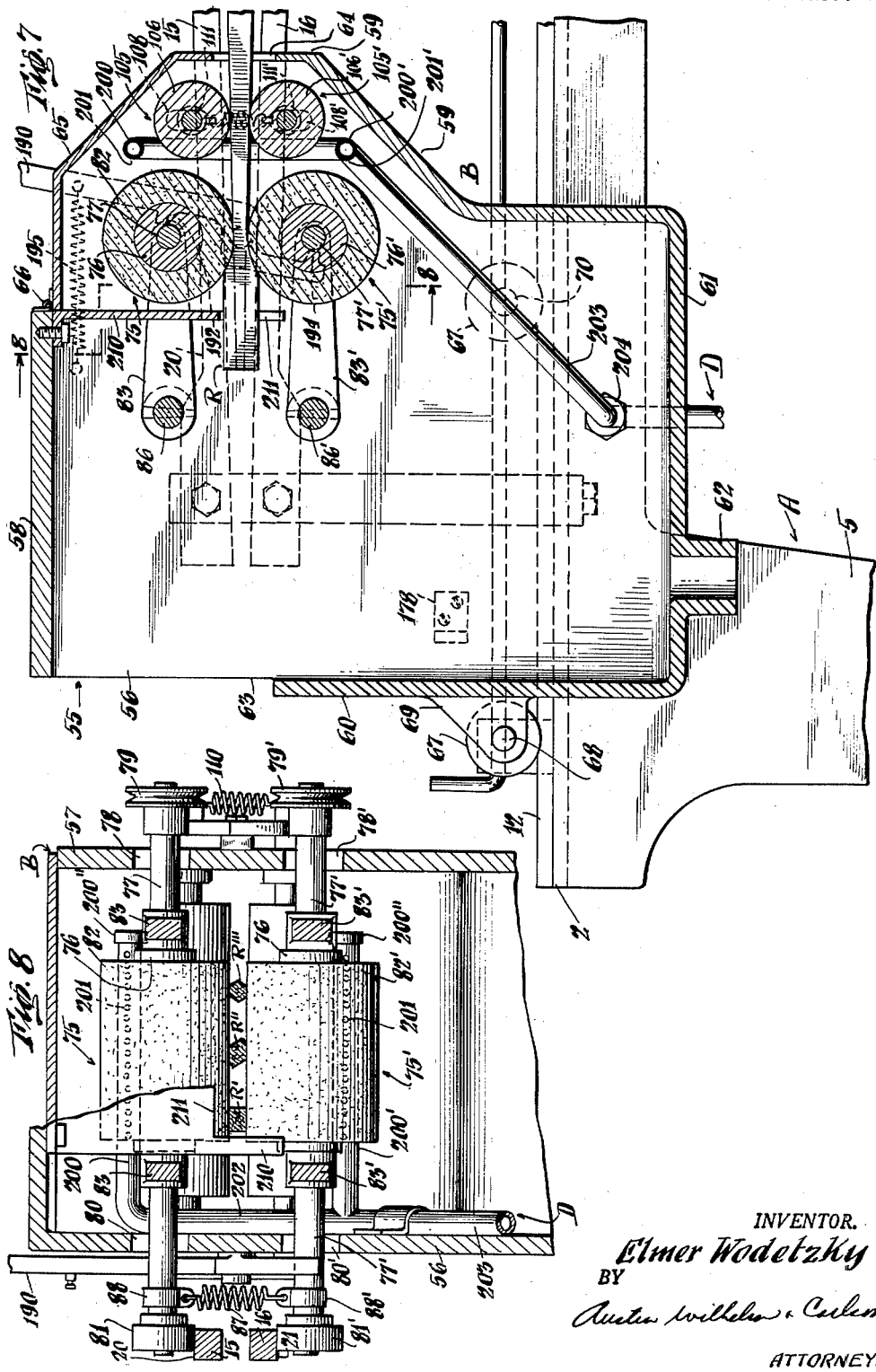
INVENTOR.
*Elmer Wodetzky*
BY
*Austin Wilhelm & Carlson*
ATTORNEYS May 2, 1950 E. WODETZKY 2,505,815
SHAPING MACHINE
Filed April 24, 1947 8 Sheets-Sheet 7
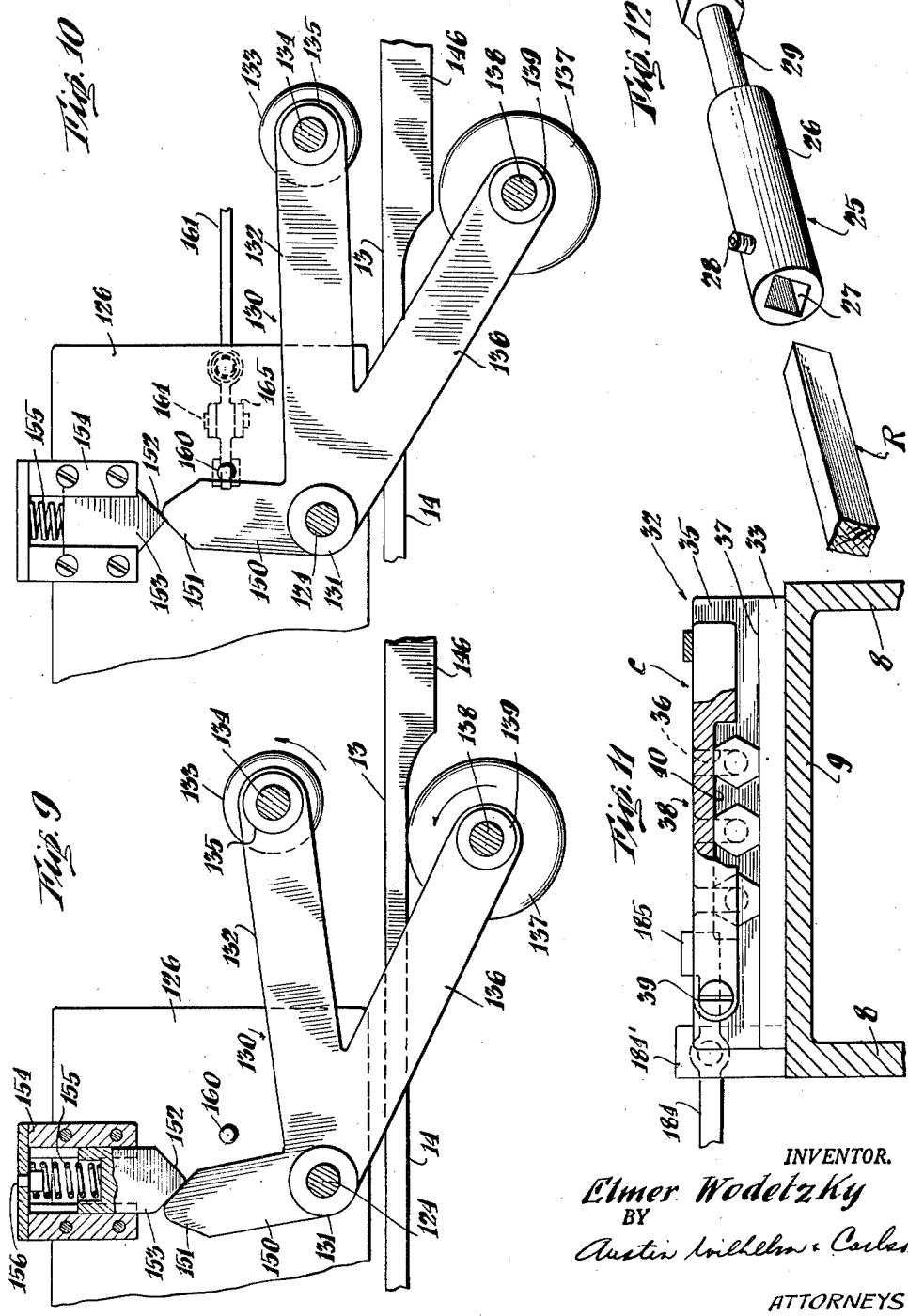
INVENTOR.
Elmer Wodetzky
BY
Austin Wilhelm + Carlson
ATTORNEYS May 2, 1950 E. WODETZKY 2,505,815
SHAPING MACHINE
Filed April 24, 1947 8 Sheets-Sheet 8
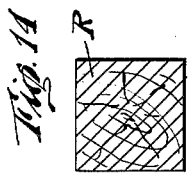
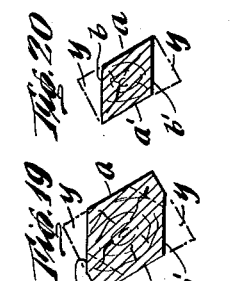
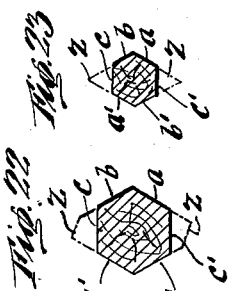
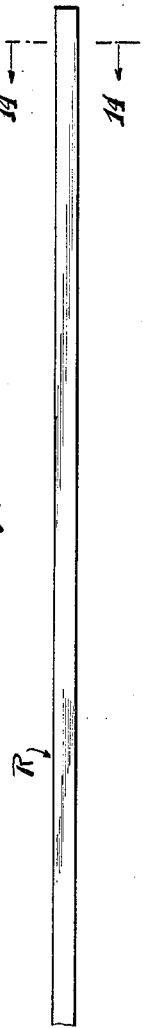
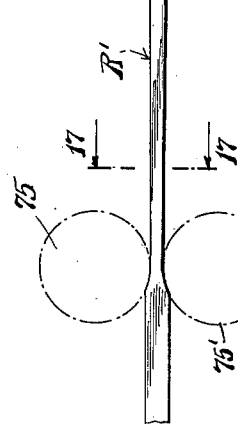
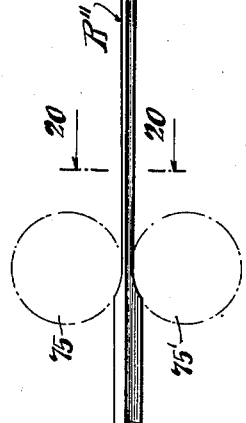
INVENTOR.
Elmer Wodetzky
BY
Austin Wilhelm & Cashon
ATTORNEYS ns. Patented May 2, 1950

2,505,815

UNITED STATES PATENT OFFICE 2,505,815

SHAPING MACHINE

Elmer Wodetzky, Lynbrook, N. Y.

Application April 24, 1947, Serial No. 743,708

15 Claims. (Cl. 51—40)

This invention relates to shaping machines and more particularly to an improved machine for the contour shaping of elongated articles or work pieces with precision accuracy and at high production speeds.

In the production of fishing poles and rods, golf club shafts, poles, rods and markers used in sports, and the handles of work tools and other implements, the work stock often requires special contour shaping so that the finished articles possesses the desired utility of artistic characteristics. Finished articles which require a particular taper or surface conformity, or require irregular or varying diametric cross sections, cannot be adeptly turned and shaped on a standard lathe.

This invention is directed to the provision of an improved shaping machine wherein various elongated articles made from wood, plywood, metal, fibre materials or plastics may be shaped and formed to present surface contours of the desired conformity with precision accuracy. This improved shaping machine is particularly adapted to the contour shaping of shafts, rods, poles and handles to provide a predetermined tapered or non-conformatory surface contour, with the finished article having a varying cross section along the axial length of the article, or wherein the cross section of the article is polygonal, off-round, eliptical or multisided to conform to utility or artistic requirements.

An object of this invention is to provide an improved machine for the contour shaping of elongated articles and work pieces with precision accuracy to the desired predetermined form.

Another object of this invention is to provide an improved shaping machine for the contour shaping of rods, poles, shafts and handles made from metal, wood, plywood or plastics so as to present facing surfaces of any desired sectional form and of varying axial contour or axial taper.

A further object of this invention is to provide an improved shaping machine for the contour shaping of various elongated articles which is strong and sturdy in construction, substantially automatic in operation, which is flexibly adapted to operate on a plurality of work pieces simultaneously, which is adjustably adapted to surface contour the articles to the desired form with precision accuracy, and which is delicately responsive to operator control.

Other objects and advantages of this invention will become apparent as the description proceeds.

The operating parts of this improved machine are mounted upon a suitable bed frame or table having a chuck assembly of improved design fixed to the head end thereof, the chuck assembly having one or more adjustable chuck elements in which the butt end of the work stock may be removably secured and clamped in rigid position. Each chuck element may be angularly rotated and is provided with a nut head presenting a plurality of angularly arranged side faces which may be clamped in position to establish the cross-sectional shape of the finished work piece during the selected shaping stages thereof.

This improved shaping machine also incorporates a traveling carriage which is power driven along the bed frame of the machine from the head end and to the tail end thereof. The traveling carriage carries and supports one or more shaping or cutting wheels which may be arranged in pairs so as to simultaneously shape two opposite side faces of the work piece positioned therebetween during travel of the carriage from the head end to the tail end of the machine. The paired shaping or cutting wheels are guided by templet rails during the advance travel of the carriage, the templet rails being adjustably supported longitudinally of the machine and provided with track faces of selected contours which determine and establish the cross-sectional contour to be given to the worked faces of the work piece. The cutting or grinding wheels also possess the desired peripheral contour to effect the desired shape formation of the worked faces of the work pieces in conformity with the final contours to be given the finished article.

The traveling carriage also incorporates a pair of pinch rolls which are spring pressed to clamp the work pieces therebetween at a point adjacent the cutting wheels, thereby to dampen the vibration of the work pieces operated upon and to provide support for the elongated work pieces extending through the casing structure of the traveling carriage. The cutting wheels are preferably driven by a motor supported by the carriage frame to travel therewith. The power supplied to the motor is controlled by a power control switch conveniently located at the head end of the machine where the operator is stationed. Means are provided adjacent the tail end of the machine for manipulating the motor control switch in a manner to halt the driving motor when the shaping run has been completed at the tail end of the machine, thereby rendering the cutting wheels inoperative during the return travel of the carriage from the tail end to the head end of the machine.

The templet rails are provided with raised track sections adjacent the tail end of the machine for causing separation of the spring pressed cutting wheels when the shaping stroke at the tail end of the machine has been completed. A lever pivotedly mounted on the carriage frame is provided with spaced bearing lugs designed to support the cutting wheel shafts when spread apart by the raised track sections of the templet rails, a coil spring being associated with this lever to automatically swing the lever into shaft supporting position when the carriage has arrived at the tail end of the machine. Thus the paired cutting wheels not only remain idle during the return travel of the carriage, but are spaced apart and out of contact with the work piece positioned therebetween so that the operator can give his attention to the removal, replacement, or angular orientation of the work pieces upon return of the carriage to the head end of the machine. When the next succeeding shaping stroke is to be performed, the operator manually manipulates a control switch to throw the cutting wheel motor into operation, and thereupon pulls the cutting wheel supporting lever so as to drop the paired cutting wheels into shaping engagement with the oriented work pieces, and the next shaping stroke then proceeds.

The carriage is propelled by a second motor mounted on the carriage frame, this motor having a driving connection with an upper traction roller and a lower traction roller designed to roll along corresponding friction tracks extending longitudinally of the machine. The traction rollers are rotatably mounted on a Y-frame pivoted to swing either the upper traction roller or the lower traction roller into driving contact with the corresponding friction tracks. One of the traction rollers is continuously rotated to advance the carriage from the head end to the tail end of the machine, and the other traction roller is continuously rotated to return the carriage from the tail end to the head end of the machine. A raised track section is provided at the tail end of the advance track to manipulate the Y-frame and automatically lift the advance traction roller from driving contact with the main depressed section of the track and to simultaneously place the return traction roller in driving contact with its traction rail, so that the carriage assembly is automatically returned to the head of the machine when it has completed its full stroke travel to the tail end of the machine.

A raised track section is provided at the head end of the machine for swinging the return traction roller out of driving contact with its friction track and for swinging the advance traction roller into driving contact with its friction track. This drive shift, however, can take place only after the operator manipulates a control lever which operates to automatically suspend both traction wheels out of driving engagement with their associated friction tracks, to thereby retain the carriage assembly in residence at the head end of the machine until the operator desires the next shaping operation to commence.

Although the characteristic features of the invention will be particularly pointed out in the claims appended hereto, the invention itself, and the manner in which it may be carried out, may be better understood by referring to the following description taken in connection with the accompanying drawings forming a part thereof, in which Fig. 1 is a plan view of the improved shaping machine illustrating an operative embodiment of this invention and particularly designed for the shaping of tapered rods of polygonal cross section.

Fig. 2 is a side elevational view of the machine shown in Fig. 1.

Fig. 3 is an enlarged side elevational view of the traveling carriage and associated drive mechanism, this view also showing a side elevational view of the chuck assembly and fragmentary parts of the supporting structure.

Fig. 3A is an enlarged side elevational view of the traveling carriage as viewed at the opposite side from that shown in Fig. 3.

Fig. 4 is an enlarged transverse cross-sectional view of the traveling carriage as the same appears when viewed in the direction of the arrows 4—4 of Fig. 3.

Fig. 5 is an enlarged fragmentary cross-sectional view taken horizontally of the machine as the same would appear when viewed along line 5—5 of Fig. 3, this view showing details of the carriage assembly and carriage drive control mechanism.

Fig. 6 is an enlarged horizontal cross-sectional view of the traveling carriage and its associated operating mechanism as the same would appear when viewed along line 6—6 of Fig. 3, this view also showing a top plan view of the associated chuck assembly and the driving mechanism for reciprocating the carriage along the bed frame.

Fig. 7 is a vertical cross-sectional view taken longitudinally through the carriage and its associated mechanism as the same would appear when viewed along line 7—7 of Fig. 1.

Fig. 8 is a fragmentary cross-sectional view taken transversely of the traveling carriage as the same would appear when viewed along line 8—8 of Fig. 7.

Fig. 9 is an enlarged elevational view of a fragmentary part of the carriage driving assembly, including traction rollers and a fragmentary portion of the track, this view showing the return traction roller in driving contact with the track.

Fig. 10 is an enlarged fragmentary elevational view of certain parts of the carriage driving mechanism, this view showing the traction rollers locked in rest position and out of driving contact with the track.

Fig. 10A is an enlarged fragmentary cross-sectional view showing certain parts of the carriage driving mechanism as the same would appear when viewed along line 10A—10A of Fig. 3.

Fig. 11 is a transverse cross-sectional view through the chuck assembly as the same would appear when viewed along line 11—11 of Fig. 6.

Fig. 12 is a perspective view of one of the chuck elements positioned to receive the butt end of the rod to be operated upon.

Fig. 13 is a side elevational view of a rod of rectangular cross section as the same may appear prior to insertion into the shaping machine.

Fig. 14 is a transverse cross-sectional view of the unshaped rod as the same would appear when viewed along line 14—14 of Fig. 13.

Fig. 15 is a side elevational view of the rod as the same appears after the first shaping operation has been substantially completed and wherein two opposite faces of the rod have been shaped by the paired grinding wheels to a predetermined tapered contour.

Fig. 16 is a transverse cross-sectional view of the rod after the first shaping operation and as the same appears adjacent the butt end thereof when viewed along line 16—16 of Fig. 15.

Fig. 17 is a transverse cross-sectional view of the rod after the first shaping operation and as the same appears adjacent the reduced end thereof when viewed along line 17—17 of Fig. 15.

Fig. 18 is a side elevational view of the rod after the second shaping operation has been substantially completed and wherein another pair of opposite faces have been given a tapered contour.

Fig. 19 is a transverse cross-sectional view of the partially shaped rod adjacent the butt end thereof when viewed along line 19—19 of Fig. 18, this view showing the possible irregular hexagonal shape of the rod at this cross section.

Fig. 20 is a transverse cross-sectional view of the partially shaped rod as the same may appear adjacent the smaller end thereof when viewed along line 20—20 of Fig. 18.

Fig. 21 is a side elevational view of the rod after substantial completion of the third shaping operation, the rod as shown having a uniform taper and being hexagonal in cross section.

Fig. 22 is a transverse cross-sectional view adjacent the larger end of the hexagonal rod as the same would appear when viewed along line 22—22 of Fig. 21, and Fig. 23 is a transverse cross-sectional view adjacent the reduced end of the hexagonal rod as the same appears when viewed along line 23—23 of Fig. 21.

Similar reference characters refer to similar parts throughout the several views of the drawings and specification.

This improved shaping machine is particularly designed for shaping elongated work pieces so that the work piece as fully shaped by the machine presents a uniform polygonal cross section of uniform predetermined taper extending axially of the work piece. More particularly, the machine is adaptably designed for shaping rods and shafts of any desired diameter and whose outer contours are rectangular, hexagonal, octagonal, decagonal or almost any desired polygonal cross section having an even number of faces. Such tapered rods and shafts may be formed from wood, plywood, metal, fibrous material or plastics. The shaped shafts and rods find particular application to the manufacture of fishing poles and rods, golf club shafts, poles, rods and markers used in sports, and the handles and shafts of work tools and other implements.

To facilitate a better understanding of the construction and operation of the machine, there is shown, in Figs. 13 to 23 inclusive, a diagrammatic illustration of the various functional steps of the machine when employed in shaping a rod R having initially a substantially uniform square cross section as shown in Figs. 13 and 14, into a rod R''' of uniform taper and of generally hexagonal cross section as shown in Figs. 21, 22 and 23. As the first step, the rod R shown in Figs. 13 and 14 is placed in the chuck assembly C of the machine and the paired grinding wheels in the traveling carriage B are driven by its associated driving mechanism to grind and shape the two opposite faces $a$ and $a'$ to the desired uniform taper as shown in Figs. 15, 16 and 17. In this operation sections marked "$x$" and shown in dotted lines in Figs. 16 and 17, will have been removed from the rod R shown in Figs. 13 and 14.

In the second shaping operation, the rod supporting chuck elements are rotated through a 60° angle from the position the chuck elements occupied during the first shaping operation shown in Figs. 15, 16 and 17. In the second shaping operation the shaped rod R'' will be produced wherein two additional opposite sides $b$ and $b'$ will be shaped to a uniform predetermined taper by removing sections $y$ from the rod as shown in Figs. 19 and 20. The rod will then present two of its opposite faces $a$ and $a'$ in tapering relationship, and the second opposite sides $b$ and $b'$ in tapered relationship.

In the third shaping operation the rod supporting chuck elements are rotated a further 60° from its second shaping position, and the paired grinding wheels in the traveling carriage B operate to shape a third pair of faces $c$ and $c'$ in tapered form to produce a tapered rod R''' of hexagonal cross section as shown in Figs. 21, 22 and 23. In this third operation, sections $z$ of the rod are ground off and removed as indicated in dotted lines in Figs. 22 and 23. A rod R''' of hexagonal cross section is thus produced, each of the six sides thereof presenting a uniform predetermined taper with the rod truly hexagonal in cross section.

It will be appreciated that the illustrative embodiments of the operating steps shown in Figs. 13 to 23 inclusive are but representative of the various cross sections which may be given to tapered rods and shafts, it being appreciated that rods and shafts of almost any desired even numbered sides of uniform taper may be shaped by a machine constructed in accordance with the teachings of this invention.

The improved shaping machine as illustrated in the drawings comprises a supporting structure A which supports a traveling carriage B having driving mechanism associated therewith designed to reciprocate the carriage along the supporting structure A. The carriage assembly B contains the grinding mechanism designed to shape the rods or shafts into the desired tapered form and of the desired cross-sectional shape and size. The machine also incorporates a chuck assembly C by means of which the butt ends of the work pieces may be firmly held during the shaping operation. A spray system D is desirably incorporated with the machine to cool the work pieces operated upon and the surfaces of the grinding wheels in shaping engagement therewith.

The supporting structure A, as shown more particularly in Figs. 1 and 2, comprises a bed frame which may be formed from a pair of parallel extending side rails 1 and 2 which may be generally angular in cross section, and a pair of end rails 3 and 4 which connect the adjacent ends of the side rails 1 and 2 to form a sturdy and rigid supporting frame. The bed frame is supported upon suitable legs 5 of convenient height. A box shaped supporting structure 7 is mounted on the head end of the bed frame to support the chuck assembly C in elevated position above the plane of the bed frame. As shown in Figs. 1, 2, 3 and 11 this box-like supporting structure 7 may comprise a pair of spaced vertical side walls 8 and a horizontal top wall 9 to provide a sturdy support for the chuck assembly C.

The side rails 1 and 2 of the bed frame present horizontally extending shelf sections 10 and 11 respectively as shown more particularly in Fig. 4, which support a pair of rails 12 which extend substantially the full length of the bed frame and upon which the supporting wheels of the carriage assembly B are free to roll. The shelf section 11 of the side rail 2 also presents an upper traction surface 13 and a lower traction surface 14 along which the upper and lower traction rollers of the carriage assembly may roll substantially the full length of the bed frame. The side rail 1 of the bed frame also supports a pair of template rails 15 and 16 which extend substantially parallel to the side rail 1 for the major length thereof. The template rails 15 and 16 are supported by a plurality of upright brackets 17, the lower leg 18 of which is secured as by bolts 19 to the horizontal shelf 10 of the side rail 1. The template rails 15 and 16 present tapered or converging track surfaces 20 and 21 respectively, along which the rollers of the upper and lower grinder shafts associated with the carriage are designed to roll. The template rails 15 and 16 may be adjustably secured to the supporting brackets 17 as by detachable bolts 22 so that the track surfaces 20 and 21 may be adjusted in position to conform to the taper which the work piece is to receive.

The chuck assembly

The chuck assembly C may be conveniently designed to support any desired number of rods or shafts to be operated upon. The chuck assembly as shown more particularly in Figs. 1, 6 and 11 has three chuck elements 25, each having a tubular body 26 presenting a suitable bore 27 into which the butt end of the work piece may be inserted and securely held in position by an adjustable set screw 28 which may be manipulated to firmly clamp the butt end of the work piece inserted into one end of the tubular body 26. The chuck assembly 25 has a neck portion 29 extending therefrom whose outer end carries a head portion 30. The head portion 30 presents a selected number of side faces 31 which perform an important function as hereafter explained.

The chuck elements 25 are supported in a yoke bar 32 as shown more particularly in Figs. 6 and 11, the yoke bar 32 having a horizontally extending foot section 33 which seats against the horizontal top wall 9 of the supporting frame 7, suitable screws or bolts 34 being provided for securing the yoke bar 32 to the horizontal top wall 9. The yoke bar 32 presents a vertical yoke wall 35 which may have one or more transversely extending slots 36 cut therein, each slot 36 being shaped to snugly receive the neck portion 29 of the chuck element 25. When the neck portion 29 of the chuck element 25. When the neck portion 29 of the chuck element is properly seated within its slot 36 of the yoke bar 32, one of the faces 31 of the nut head 30 of the chuck element will snugly and flatly seat against the upper surface 37 of the foot section 33 of the yoke bar.

Means are provided to clamp the nut heads 30 of the chuck elements 25 in any desired rotated position. A clamp bar 38 is pivoted as by pivot pin 39 to one end of the yoke bar 32, the clamp bar 38 presenting a contact face 40 adapted to snugly seat against the adjacent side faces 31 of the nut heads 30. Means are provided for retaining the clamp bar 38 in locked position. The locking means, as shown more particularly in Figs. 3, 3A and 6, may comprise a bracket 41 having a foot section 42 thereof suitably secured as by screws to the horizontal wall 9 of the box-like supporting structure 7. A pressure finger 43 which is pivoted at one end thereof as by pivot pin 44 to the spaced vertical legs 45 of the bracket 41, has a relatively flat end portion 46 at the other end thereof adapted to snugly seat against the free end of the clamp bar 38. Means such as a lever handle 49, pivoted at the lower end thereof by hinge pin 50 to the bracket 41, may be employed to manipulate the pressure finger 43. The lever 49 is preferably connected to the pressure finger 43 by a toggle link 51 so that when the lever 49 is swung into abutment with a stop pin 52 projecting from the pressure finger 43, the desired pressure will be maintained by the pressure finger 43 on the clamp bar 38.

As one operating procedure, an unworked rod R will be inserted into each of the several chuck elements 25 of the chuck assembly C and securely clamped therein. In the first shaping operation, the first pair of opposite faces $a$ and $a'$ of the rod are shaped to desired taper. The clamp members 25 are then rotated either clockwise or counter clockwise so that the adjacent face of the nut head 30 would seat against the surface 37 of the foot section 33 of the yoke bar 32. The nut heads 30 are then clamped in this position by the clamp bar 38, and the second shaping operation proceeds to form a second pair of opposite faces $b$ and $b'$ to the desired tapered form. The nut heads 30 of the clamp elements 25 would again be rotated to the next adjacent face thereof to seat against the upper surface 37 of the foot section 33 of the yoke bar 32, the nut heads 30 again being held in this set position by the clamp bar 38. The third shaping operation then proceeds during which the faces $c$ and $c'$ of the rod will be shaped to the desired shape and form. The operations above described are continued until all of the desired polygonal faces of the work pieces have been shaped to the desired tapered form, whereupon the fully shaped rods would be removed from the chuck elements 25 and replaced by a new set of unworked rods or work pieces R.

The carriage assembly

As shown more particularly in Figs. 4, 6, 7 and 8, the operating mechanism of the carriage assembly is contained within or supported by a box-like structure 55 designed to be reciprocated along the rails 12. The box-like structure 55 may be formed of heavy metal plate presenting a pair of opposite side walls 56 and 57, a top wall 58, a front wall 59, a rear wall 60 and a bottom wall 61, the bottom wall 61 preferably extending below the plane of the bed frame of the machine. Since it is desirable to apply cooling water to the grinding rollers and the work pieces operated upon, it is desirable to make the box-like structure 55 as a substantially complete enclosure, with the bottom wall 61 thereof having a drain opening 62 through which the used water is removed. The rear wall 60 of the box-like structure 55 has a suitable opening 63 therein through which the work pieces may extend, the front wall 59 also having a suitable entrance opening 64 through which the work pieces project into the box-like structure 55. To provide for ready access to the operating mechanism, the box-like structure 55 may be provided with a suitable hinged cover 65 forming a part of the upper section thereof which may be hinged to the top wall 58 as by suitable hinges 66, as shown in Figs. 1, 3A and 7.

As shown more particularly in Figs. 3, 3A, 4, 5 and 7, the box-like structure 55 and associated mechanism is supported upon the rails 12 by suitable wheels 67 which may be four in number. The front wheels 67 may be journaled on journal pins 68 fixed to suitable brackets 69 attached to the side walls 56 and 57 of the box-like structure 55. The rear wheels 67 are each journaled upon a journal pin 70 suitably fixed to the adjacent side walls 56 and 57 of the box-like structure 55. The box-like structure 55 and its associated mechanism is thus free to roll back and forth along the track rails 12 which extend substantially the full length of the bed frame of the machine.

The work pieces which are rigidly held at the butt end thereof by the chuck assembly C, project through the entrance opening 64 and the exit opening 63 of the box-like structure 55 as the carriage assembly is reciprocated along the length of the fixedly held work pieces. The shaping operation is performed by a pair of cooperating upper and lower grinding assemblies 75 and 75' between which the work pieces extend. The upper grinding assembly 75, as shown more particularly in Figs. 6, 7 and 8, comprises a barrel body 76 having a sturdy shaft 77 extending therethrough. One end of the shaft extends through an opening 78 in the side wall 57 of the box-like structure 55 of the carriage. A driving pulley 79 is fixed to the extended end of the shaft 77. The other end of the shaft 77 extends through a like opening 80 in the side wall 56 of the box-like structure 55, and the adjacent extended end of the shaft 77 carries a roller 81 designed to roll on the tapered track surface 20 of the templet rail 15. The barrel body 76 of the grinding assembly 75 carries and supports any desired number of grinding wheels or a wide grinding wheel 82 rigidly fixed thereto. The grinding wheel 82 may be formed from an abrasive which presents a sharp cutting peripheral surface designed to cut one face of the work piece to the desired tapered contour.

The lower grinding assembly 75' is substantially similar in form and construction to the upper grinding assembly 75 as above described, and presents a barrel body 76' fixed to the horizontally extending shaft 77', one end of which extends through a suitable opening 78' in the side wall 57 of the box-like structure, the projecting end of the shaft 77' having a suitable pulley wheel 79' secured thereto. The other end of the shaft 77' projects through an opening 80' in the side wall 56 of the box-like structure 55, the adjacent extended end of the shaft 77' having a roller 81' fixed thereto which has rolling contact with the traction surface 21 of template rail 16. The barrel body 76' has any desired number of grinding wheels or a single wide grinding wheel fixed thereto which presents a sharp cutting periphery. In case a plurality of paired grinding wheels are used, the grinding wheels of the grinding assembly 75' are paired with the corresponding grinding wheels of the grinding assembly 75 so that opposite faces of the work pieces extending therebetween are shaped to the desired contour. Work pieces R', R'' and R''' shown in cross section in Fig. 8 of the drawings, are merely representative of the cross-sectional shapes which can be formed by the paired grinding wheels 82 and 82'.

The shaft 77 of the grinding assembly 75 is supported on a pair of spaced rocker arms 83, one end of each arm carrying a suitable journal 84 which embraces the shaft 77 and provides rotating support therefor. The other end of each of the rocker arms 83 are provided with a suitable tubular collar 85 through which a supporting shaft 86 extends, the ends of the shaft 86 being rotatably journaled in the adjacent side walls 56 and 57 of the box-like structure 55. The shaft 77 and grinding wheels 82 are thus mounted to have a vertically swinging movement as fulcrumed by the shaft 86', as shown in Figs. 6, 7 and 8.

The rollers 81 and 81' are maintained in rolling engagement with the corresponding templet rails 15 and 16 by a coil spring 87 whose ends are connected to bearing collars 88 and 88' mounted on the shafts 77 and 77' respectively. The templet tracks 15 and 16 may be adjusted on their supporting brackets 17 to maintain the adjacent peripheries of the paired grinding wheels 82 and 82' in predetermined spaced relation as defined by the adjusted position of the track faces 20 and 21 of the templet rails 15 and 16, it being appreciated that the shape of the track faces 20 and 21 and the relative adjusted position thereof determines the taper contour to be given to the opposite paired faces of the work piece operated upon, as is evident by referring to Figs. 1, 2 and 3A.

The paired grinding assemblies 75 and 75' are driven by a driving motor 90 mounted upon the top wall 58 of the box-like structure of the carriage. The motor pulley wheel 91 is connected as by drive belt 92 to a pulley wheel 93 fixed to a tubular collar 94 rotatably mounted on a stub shaft 95 which is rigidly secured to the side wall 57 of the box-like structure 55 by a bolt extension 96. A secondary pulley wheel 97 fixed to the driven tubular sleeve 95 is connected by a belt 98 to the pulley wheel 79 fixed to the shaft 77 of the grinding assembly 75 as shown in Figs. 4 and 6. A gear wheel 99 also fixed to the tubular sleeve 94 is in driving engagement with a gear wheel 100 fixed to a tubular sleeve 101 rotatably mounted on a stub shaft 102 which has a bolt extension 103 which is secured to the side wall 57 of the carriage assembly. The tubular sleeve 101 also has a pulley wheel 104 fixed thereto which drives a belt 98' which is trained over a pulley wheel 79' fixed to the shaft 77' of the grinding assembly 75' above described. Thus it will be appreciated that the paired grinding wheels 82 and 82' are mechanically driven in unison in opposite directions, as is evident by referring to Figs. 2, 4 and 6.

A pair of pinch roll assemblies 105 and 105' are provided to resiliently grip the work pieces and thus prevent disturbing vibration thereof as the work pieces are ground and shaped by the grinding roll assemblies 75 and 75' and also to provide support for the work pieces during the return journey of the traveling carriage B. The pinch roll assembly 105, as shown more particularly in Figs. 6 and 7, comprises a roll 106 which may be formed of steel or relatively hard rubber which is fixed to a shaft 107 which extends through elongated slots 108 formed in the side walls 56 and 57 of the box-like structure 55 of the reciprocating carriage B. Collars 109 are fixed to the shaft 107 to prevent weaving movement thereof. The lower pinch roll assembly 105' likewise comprises an elongated roll 106' fixed to a shaft 107' whose ends extend through elongated slots 108' formed in the side walls 56 and 57 of the box-like structure 55 of the carriage, as shown in Figs. 3A and 8.

The adjacent peripheries of the pinch rolls 106 and 106' are resiliently drawn toward each other by a pair of coil springs 110. The ends of each spring 110 are secured to bearing collars 111 and 111' embracing the projecting ends of the roll shafts 107 and 107' respectively. When the work pieces are inserted between the adjacent peripheries of the pinch rolls 106 and 106', these pinch rolls will be wedged apart by the interleaved thickness of the work pieces, a predetermined roll pressure being nevertheless exerted against the opposite faces of the work faces by the resilient compression springs 110. The pinch rollers 106 and 106' positioned adjacent the paired grinding wheels 82 and 82' aid in preventing any rotative movement of the work pieces during the grinding operation, damper any objectionable vibration of the work pieces as they are being ground to the desired tapered shape, and also serve to support the work pieces during the return journey of the traveling carriage B.

Carriage reciprocating mechanism

The machine incorporates driving mechanism for automatically reciprocating the carriage assembly first from a position adjacent the chuck assembly C towards the tail end of the bed frame, during which movement the opposite faces of the work pieces are ground to the desired taper, and then to automatically return the carriage assembly and its associated grinding mechanism to the starting position adjacent the chuck assembly C. The driving mechanism comprises a motor 115 mounted upon a shelf 116 which projects from the side wall 57 of the box-like structure 55 of the reciprocating carriage. The pulley wheel 117 of the motor drives the belt 118 which is trained around the pulley wheel 119 of a speed reducer unit 120 as shown more particularly in Fig. 4. The speed reducer unit 120 has a driven sprocket wheel 121 connected by a chain drive 122 to a corresponding sprocket wheel 123 fixed to a stub shaft 124 rotatably mounted on a bracket 125 which is fixed to a flange 126 which depends from the shelf 116, the flange 126 also having a shelf extension 127 which supports the speed reducer unit 120.

A Y-arm 130 having a bearing boss 131 is mounted upon the stub shaft 124. The Y-arm 130 has an upper arm 132 which carries an upper traction wheel 133 fixed to a stub shaft 134 rotatably mounted in a bearing collar 135 provided at the free end of the upper arm 132. The lower arm 136 of the Y-arm 130 also supports a lower traction wheel 137 fixed to a stub shaft 138 rotatably mounted in a bearing collar 139 provided at the free end of the arm 136, as shown more particularly in Figs. 3, 6, 9 and 10A.

The driven stub shaft 124 carries a second sprocket wheel 140 fixed thereto over which is trained a drive chain 141. The chain 141 is also trained around a sprocket wheel 142 fixed to the stub shaft 134 which supports the traction roller 133, and is also trained around a sprocket wheel 143 fixed to stub shaft 138 which supports the traction roller 137. The motor 115 thus serves to drive the traction rollers 133 and 137 mounted on the Y-arm 130 in the direction indicated by the arrows as shown in Fig. 9. The traction roller 133 is designed to roll along the track face 13, and the traction roller 137 is designed to roll along the track face 14 associated with the shelf section 11 of the side rail 2 of the machine as heretofore described. It will be noted by referring more particularly to Figs. 1 and 2, that the upper track face 13 has a raised track section 145 adjacent the foot end of the bed frame upon which the upper traction roller 133 is designed to roll, and that the lower track face 14 has a raised track section 146 adjacent the head end of the bed frame upon which the lower traction roller 137 is designed to roll.

The Y-arm 130 has an upwardly projecting lug section 150 which may be formed as an integral part of the bearing boss 131 of the Y-arm 130, the lug section 150 having a tapered nose portion 151 designed to have rubbing contact with a corresponding shaped nose 152 of a spring pressed bullet catch 153 which is slidably mounted on a bracket 154 fixed to the downwardly extending flange 126 of the supporting framework. A coil spring 155 has one end thereof fixed to the bracket 154 by a connecting stud 156, the other end of the coil spring 155 being in pressing engagement with the adjacent end of the bullet catch 153 as shown more particularly in Figs. 9, 10 and 10A.

When the rotating upper traction roller 133 is in driving contact with the upper track face 13, the carriage structure B and its associated mechanism is horizontally advanced from a position adjacent the chuck assembly C towards the tail end of the bed frame. When the carriage reaches the tail end of the bed frame, the upper traction roller 133 will have rolled onto the raised track section 145, causing a rocking movement of the Y-arm 130 which swings the nose portion 151 of the Y-arm lug 150 from its position on the right hand side of the nose portion 152 of the bullet catch 153 to the left hand side thereof as is evident by referring to Figs. 2, 9 and 10. This movement places the lower traction roller 137 in driving engagement with the lower track face 14 which rotates in a direction to return the carriage assembly B from the tail end of the bed frame to the head end thereof adjacent the chuck assembly C. When the lower traction roller 137 moves on to the raised track section 146 at the head end of the machine, the nose portion 151 of the Y-arm lug 150 is automatically swung from its position on the left hand side of the nose portion 152 of the bullet catch 153 to the right hand side thereof. When this occurs, the upper traction roller 133 would normally be swung into driving engagement with the track face 13 so as to immediately return the carriage assembly B to the tail end of the machine.

Means are however provided to releasably retain both the upper traction roller 133 and the lower traction roller 137 out of driving contact with the respective track faces 13 and 14 so as to give the operator an opportunity to reload the chuck assembly with unworked rods, or to remove the finally shaped rods therefrom, or to make angular rotation of the chuck elements 25 of the chuck assembly so as to present another pair of opposite side faces of the work pieces to the action of the paired grinding wheels 82 and 82'. The retaining means for holding the continuously driven traction wheels 133 and 137 in neutral suspended position comprises a retractable stop pin 160 which extends through a smoothly fitted bore opening in the downwardly extending flange section 126 of the supporting structure, as shown more particularly in Figs. 5, 9 and 10. When the stop pin 160 is in extended position, it provides a stop abutment against which the right hand side of the Y-arm lug 150, as viewed in Figs. 9 and 10, may abut to retain the upper traction roller 133 and the lower traction roller 137 supported by the Y-arm 132 in suspended position and out of driving contact with the track faces 13 and 14.

The stop pin 160 is connected to one end of a manipulating lever 161 as by a stud 162 projecting from the stop pin 160, the stud 162 extending through an elongated slot 163 provided in the end of the lever 161. The lever 161 is pivotally supported by a hinge pin 164 which is fixed to a bracket 165 attached to the adjacent carriage structure. The lever arm 161 is provided with a convenient handle 166 by means of which the same may be manually manipulated to withdraw the stop pin 160 from its abutting position against the Y-arm lug 150. A coil spring 167 is positioned so that the ends thereof abut against the lever 161 and the adjacent depending flange section 126 of the supporting structure. The coil spring 167 is held in its mounted position by a lug pin 168 extending from the lever arm 161 and a lug pin 169 extending from the depending flange section 126. The coil spring 167 operates to normally retain stop pin 160 in extended position so that when the lower traction wheel 137 has rolled onto the raised track section 146, the Y-arm lug 150 will abut the stop pin 160 so as to suspend both traction wheels 133 and 137 in out of driving contact with the track faces 13 and 14.

Thus the stop pin 160 serves to automatically halt the traveling movement of the carriage assembly when the carriage assembly has been returned to the head end of the machine adjacent the chuck assembly C. The operator can then methodically reload, or unload the work pieces, or angularly shift the chuck elements 25, so as to place the work pieces in thorough readiness for the next succeeding shaping operation before he manipulates the lever arm 161 to withdraw the stop pin 160. When the stop pin 160 is withdrawn, the spring pressed bullet catch 153 automatically swings the Y-arm lug 150 fully over to the right side thereof, thus lowering the upper traction wheel 133 into driving contact with the track face 13. When this is accomplished, the carriage assembly will automatically travel towards the tail end of the machine, and during this traveling movement the grinding assemblies 75 and 75' will cooperate to shape the adjusted opposite side faces of the work pieces to the desired tapered form. Thus the traction wheels 133 and 137 may be continuously driven by the driving motor 115 during the time in which the machine is in production operation.

It is desirable, however, to halt the rotative movement of the paired grinding wheels 82 and 82' when the carriage assembly has reached the tail end of the machine and the paired grinding wheels 82 and 82' have completed their assigned shaping operation at the tip end of the work pieces. As shown more particularly in Figs. 1, 2, 3 and 6, the driving motor 90 is wired to a switch box 170 which is equipped with a manipulating lever 171 which may be swung through an angle of approximately 120°. The manipulating lever 171 has an elongated slot 172 therein through which a pin 173 projects, the pin 173 being fixed to the boss portion 174 of an elongated manipulating rod 175. The rod 175 extends longitudinally of the machine from the head end thereof where the switch box 170 is located, to a point adjacent the tail end thereof. The manipulating rod 175 is slidably supported by a pair of spaced brackets 176 which are fixed to the side rail 1 of the machine.

The tail end of the manipulating rod 175 is provided with an angular extension 177 which is designed to be engaged by a bracket lug 178 projecting from the side wall 56 of the box-like structure 55 of the carriage. When the carriage assembly reaches the tail end of the machine, the bracket lug 178 will make contact with the angular extension 177 of the manipulating rod 175 so as to swing the manipulating lever 171 of the switch box 170 to the left as shown in Fig. 6, and thereby shut off the current to the motor 90. The head end of the manipulating rod 175 is provided with a handle extension 179 which may be manually manipulated to swing the manipulating lever 171 of the switch box 170 to the right, as shown in Fig. 6 so as to repower the motor.

Thus it will be appreciated that the paired grinding or cutting wheels 82 and 82' are driven by the motor 90 during the travel of the carriage assembly from the head end to the tail end of the bed frame, and to the point where the lug bracket 178 associated with the carriage assembly contacts the angular extension 177 to manipulate the rod 175 and throw the motor out of operation. The motor 90 is not again thrown into operation by the operator until the carriage assembly has returned to the head end of the machine, and only after the work pieces have been suitably adjusted for the next succeeding shaping operation. When the succeeding grinding operation is to be performed, the operator throws the switch lever 171 to the right as shown in Fig. 6, to power the motor 90 and drive the paired grinding wheels 82 and 82', and immediately thereafter the operator manipulates the lever 161 to place the upper traction roller 133 in driving contact with the track face 13.

To facilitate removal of the finished work pieces, the insertion of unworked pieces into the machine, and to make angular adjustment of the work pieces in the machine, it is desirable to provide means for separating the pinch rolls 106 so that the adjacent peripheries thereof are spaced a convenient distance, and for also separating the adjacent peripheries of the paired shaping wheels 82 and 82' a convenient distance to permit convenient insertion, removal and angular rotation of the work pieces.

Manually operated means are provided for separating the elongated pinch rolls 106 and 106' normally resiliently drawn together by the coil springs 110, which means may comprise a pair of spaced rocker shoes 180 which are journaled on stud shafts 181 projecting from the adjacent side walls 56 and 57 of the carriage frame structure 55. The upturned nose ends 182 of the rocker shoes 180 are rigidly connected by a transversely extending rod 183 as shown more particularly in Figs. 2 and 6. A manually manipulated lever 184 pivotally mounted upon a bracket 184' fixed to the top wall 9 of the supporting structure 7, is provided with a laterally extending lug 185 designed to seat under the connecting rod 183. By manually manipulating the lever 184, it will be appreciated that the rocker shoes 180 may be rocked on their associated stub shafts 181.

Each of the rocker shoes 180 is connected by a toggle link 186 to the shaft 107 of the upper pinch roll 106, and by a toggle link 187 to the shaft 107' of the lower pinch roll 106'. More particularly, the toggle link 186 is connected at one end thereof by pivot pin 188 to the rocker shoe 180, and the other end thereof carries a tubular boss 189 which embraces the shaft 107 of the pinch roll 106. Similarly, the toggle link 187 is connected by pivot pin 188' to the adjacent rocker shoe 180, and by a boss portion 189' to the shaft 107' of the lower pinch roll 106. It will be appreciated by referring more particularly to Fig. 3, that when the nose ends 182 of the spaced rocker shoes 180 are raised as by manipulating the lever 184, the toggle links 186 and 187 will spread the pinch roll supporting shafts 107 and 107' apart to a convenient distance to permit substantially unobstructed insertion, removal, and manipulation of the work pieces between the spaced peripheries of the associated pinch rolls 106 and 106'.

The grinding wheels 82 and 82' are also spread apart to permit insertion, removal and reorientation of the work pieces within the carriage assembly by a manually manipulated lever 190 which is illustrated more particularly in Figs. 3 and 7. The lever 190 is rockably mounted on a stub shaft 191 projecting from the side wall 56 of the carriage frame structure. The lever 190 has a bearing lug 192 projecting from the side face thereof designed to swing under the shaft 77 which supports the upper shaping wheel 82. The lever 190 has a deformed extension 193 which is provied with a bearing lug 194 adjacent the end thereof designed to swing over the shaft 77' which supports the lower shaping wheels 82'. A coil spring 195 whose ends are connected to the lever 190 and the adjacent side wall 56 of the carriage frame structure, serves to normally retain the lever 190 in substantially vertical position as shown in Fig. 3.

When the templet rollers 81 and 81' reach the tail end of the track faces 20 and 21 of the templet rails 15 and 16, the templet roller 81 rolls on to a raised track section 196 at the end of templet rail 15, and the templet roller 81' rolls onto a raised track section 197 of templet track 16, as shown more particularly in Figs. 1 and 2. When the templet rollers 81 and 81' are positioned upon raised track section 196 and 197 respectively, the shafts 77 and 77' to which they are attached are spread apart and the paired shaping wheels 82 and 82' are also spread a corresponding distance apart. When the grinder shafts 77 and 77' are thus spread apart, the coil spring 195 automatically swings the lever 190 into substantially vertical position as shown in Fig. 3, with the bearing lug 192 swung under the shaft 77, and the bearing lug 194 swung over the shaft 77'. When the carriage assembly makes its return travel to the head end of the machine, the shafts 77 and 77' are supported and maintained in spaced relationship by the bearing lugs 192 and 194 of the lever 190, thereby holding the shaping wheels 82 and 82' spaced from the work piece during return travel of the carriage assembly to the head end of the machine and during residence of the carriage assembly at the head end of the machine. When the work pieces have been oriented to the desired working position, the operator swings the lever 190 to the right as shown in Figs. 3 and 7 so as to withdraw the bearing lugs 192 and 194 thereof from their shaft supporting positions, permitting the shafts 77 and 77' to be drawn together by the coil springs 87 so that the adjacent peripheral faces of the paired grinding wheels 82 and 82' will rest against the opposite paired faces of the work pieces as oriented. The paired grinding wheels 82 and 82' would normally be dropped into operating position at the head end of the machine after the driving motor 90 is thrown into operation by a manual manipulation of the switch arm 171.

*Water cooling assembly*

It is appreciated that the grinding or cutting contact of the paired shaping wheels 82 and 82' with the work pieces creates considerable heat, which, unless dissipated, might damage or burn the work pieces and disintegrate the shaping wheels. The grinding wheels and work pieces are kept cool during the shaping operation by water sprays. One of the water sprays is projected against the upper grinding wheel 82 and the adjacent ground face of the work pieces by a horizontally extending spray pipe 200 having properly located nozzle holes 201, therein as shown more particularly in Figs. 7 and 8. A second spray is projected by a lower spray pipe 200' having a series of suitably arranged nozzle openings 201' therein, arranged to direct the water spray against the lower grinding wheels 82' and the adjacent face of the work pieces. The horizontally extending spray pipes 200 and 200' are connected by a riser pipe 202 downwardly to a fitting 204 in the side wall 56 of the carriage frame structure. A flexible hose line 205 is connected to the fitting 204 at one end thereof, the other end being connected to a suitable water pump 206 which may be positioned on the floor below the bed frame of the machine, as shown more particularly in Fig. 2. The water pump is supplied with water by means of a suitable supply pipe 207, and the pump 206 may be driven by a motor 208 through a suitable speed reducer 209.

A baffle plate 210, suspended from the top wall 58 of the box-like structure 55 of the carriage assembly B, projects downwardly adjacent the grinding wheels 82 and 82' to confine the water splash and redirect some of the sprayed water back against the grinding wheels 82 and 82'. The baffle plate 210 may extend horizontally across the box-like structure 55 of the carriage assembly, with the ends of the baffle plate 210 positioned closely adjacent to the side walls 56 and 57 thereof. As illustrated in Fig. 8, the baffle plate 210 is provided with suitable openings 211 therein through which the work pieces may project. The sprayed water, after having performed the desired cooling effect, drops down to the bottom wall 61 of the box-like structure of the carriage assembly and escapes through the drain opening 62 therein. Since the drain opening 62 travels with the carriage assembly, a suitable stationary tank 212 having an inclined bottom wall 213 may be positioned below the bed frame of the machine and supported upon suitable brackets 214 fixed to the supporting legs 5 thereof. The receiving tank 212 is provided with a suitable drain pipe 215 at the lower end thereof through which the used water may be removed.

*Operation of the machine*

This improved shaping machine is at all times under the convenient and flexible control of the operator. Through the simple manipulation of the lever 184, the rocker shoes 180 may be manipulated to separate the pinch rolls 106 and 106' for the convenient insertion, removal or orientation of the work pieces. At the starting position of the carriage assembly adjacent the head end of the machine, the grinding or carving wheels 82 and 82' have been automatically separated at the tail end of the machine and automatically mounted upon the bearing lugs 192 and 194 of the lever 190, thus permitting insertion, removal and reorientation of the work pieces with ease and convenience. The traversing motor 115 may be continuously operated, with the spring pressed stop pin 160 relied upon to maintain the driven traction rollers 133 and 137 out of driving engagement with the track faces 13 and 14 during residence of the carriage assembly adjacent the head end of the machine.

When the operator has completed his task of mounting, removing or orienting the work pieces in the chuck elements 26 of the chuck assembly C and is ready for the shaping operation to proceed, he pulls the rod extension 170 to swing the switch lever 171 into operative position to drive the motor 90 and rotate the paired grinding or cutting wheels 82 and 82'. The operator next pulls the conveniently located lever 190 which drops the paired grinding or cutting wheels 82 and 82' into working engagement with the work piece. Substantially simultaneously, the operator pulls the lever 161 to withdraw the stop pin 160 from abutment contact with the Y-arm lug 150 thereby causing the traction wheel 133 to drop into driving contact with the track face 13. The carriage assembly thereupon immediately advances forward toward the tail end of the machine. During the forward progress of the carriage assembly, the paired grinding or cutting wheels 82 and 82' progressively shape the paired opposite faces of the work pieces in accordance with the desired predetermined contour and taper, as determined by the peripheral cutting contour of the cutting wheels 82 and 82', and as further determined by the contour of the track face 20 and 21 of the templet rails 15 and 16.

When the traveling carriage has traveled to a position towards the tail end of the machine where the first shaping operation on the work pieces has been completed, the templet rollers 81 and 81' associated with the grinder assembly 75 and 75' will have rolled onto the raised track sections 196 and 197 respectively of the templet rails 15 and 16 to thereby separate the shafts 77 and 77' which support the paired grinding or cutting wheels 82 and 82'. Thereupon, the coil spring 195 automatically swings the lever 190 forwardly so as to place the bearing lugs 192 and 194 thereof into a position to support the adjacent shafts 77 and 77', in which position the paired grinding or cutting wheels 82 and 82' are out of contact with the work pieces during the return travel of the carriage assembly to the head end of the machine.

When the rollers 81 and 81' have mounted the raised track sections 196 and 197 of the templet rails 15 and 16, the bracket lug 178 will substantially simultaneously engage the angular extension 177 of the manipulating rod 175 to swing the switch lever 171 into cut-off position, thereby halting the operation of the driving motor 90 which drives the paired grinding or cutting wheels 82 and 82'. Within a split second thereafter, the continuously driven upper traction wheel 133 will have mounted the raised track section 145, which may be adjustably positioned adjacent the tip end of the work pieces.

When the upper traction wheel 133 has mounted the raised track section 145, the nose portion 151 of the Y-arm lug 150 will be swung to the opposite side of the nose portion 152 of the bullet catch 153, thereby placing the continuously driven lower traction wheel 137 in driving engagement with the track face 14, which driving engagement operates to draw the carriage assembly automatically to the head end of the machine. When the carriage assembly has thus been automatically returned to the head end of the machine, the operator gives his attention to the desired orientation of the work pieces. The next operating cycle is executed by repeating the procedure above described.

A machine constructed in accordance with the principles of this invention may be employed to face, shape and/or taper rods, shafts, and other elongated work pieces made either of metal, wood, plywood, plastics, or other workable material, to any desired shape, size and form. The machine as shown in the drawings thus represents only one embodiment of the machine, and is shown for the purpose of conveying a more complete understanding of this invention, and as a typical adaptation of this invention for the shaping of tapered rods of polygonal cross section.

The contour of the track faces 20 and 21 of the templet rails 15 and 16 may be shaped or adjusted as desired to fix and determine the traveling contour and cross-sectional shape of the processed work pieces. The operating parts of this improved machine may be constructed in any desired size to operate on work pieces either large or small. The shape determining periphery of the paired shaping wheels 82 and 82' can be made irregular or smooth, concave or convex, or any other desired peripheral shape to effect a predetermined contour formation to the work pieces opertaed upon. Rotary knife cutters may be substituted for the abrasive grinding wheels 82 and 82', as the work pieces operated upon and the results desired may require. Only a single pair of grinding wheels or rotary cutters may be associated with the machine, or any desired plurality of grinding wheels or rotary cutters may be installed in the machine in accordance with production schedules and output capacities required.

The chuck assembly C may be provided with any desired number of chuck elements 25 having convenient sockets, with means for detachably connecting the butt ends of the work pieces thereto. The nut heads 30 thereof may be conveniently provided with polygonal side faces 31 corresponding in number to the side faces to be formed on the finished work pieces. The chuck elements 25 may be angularly rotated and fixed in predetermined position to accurately determine the side faces to be formed on the finished work pieces, with assurance that all of the finished work pieces will be similar in shape, size and form. A series of chuck elements 25 of different forms and with different shaped nut heads 30 to shape different classes of work pieces, may be interchangeably inserted and incorporated in the chuck assembly C as desired.

In production operations, a series of work pieces all in the same stage of shaping production may be mounted in the chuck elements 25, or a series of work pieces at varying advanced stages of shaping production may be mounted in the chuck elements to receive the next succeeding shaping operation. It is however, usually preferable to advance a series of work pieces through the various shaping stages simultaneously so that final shaping operation on all the work pieces is complete at the same time.

While certain novel features of the invention have been disclosed herein, and are pointed out in the annexed claims, it will be understood that various omissions, substitutions, and changes may be made by those skilled in the art without departing from the spirit of the invention.

What is claimed is:

1. An improved machine for the contour shaping of elongated work pieces including in combination, a bed frame, a traveling carriage movable along the bed frame, shaping means associated with the carriage for contour shaping the work piece along the axial length thereof, driving means for reciprocating the carriage along the bed frame, and a chuck assembly supported at the head end of the bed frame for detachably securing the work piece in a fixed position, said chuck assembly including a chuck element having a socket portion designed to receive the butt end of the work piece, gripping means associated with said socket portion for detachably securing the work piece thereto, a yoke bar having a pocket therein for detachably supporting the chuck element, said chuck element having a projecting head portion presenting side faces in contour conformity with the intended cross-sectional shape of the finished work piece, means for supporting said head portion in predetermined oriented position, and means for releasably clamping said chuck element in the selected oriented position.

2. An improved machine for the contour shaping of elongated articles including in combination, a bed frame, a traveling carriage movable along the bed frame, shaping means associated with the carriage for contour shaping the work pieces along the axial length thereof, driving means for moving the carriage along the bed frame, and a chuck assembly supported at the head end of the bed frame for detachably securing the work pieces in fixed position, said chuck assembly including chuck elements each having a socket portion designed to receive the butt end of the work piece, gripping means associated with each socket portion for detachably securing the work piece thereto, a yoke bar having pockets therein for detachably supporting the work pieces in spaced relation, each of said chuck elements having a projecting head portion presenting side faces in contour conformity with the intended cross-sectional shape of the finished work piece, means for supporting said head portions in predetermined oriented position, and means for releasably clamping said chuck elements in the selected oriented position.

3. An improved machine for the contour shaping of elongated articles including in combination, a bed frame, a chuck assembly for detachably supporting a work piece in fixed operative position, a traveling carriage movable along the bed frame, driving means for advancing the carriage along the bed frame, said carriage having a pair of shaping rollers rotatably mounted on said carriage, automatic means for manipulating said shaping rollers during travel of the carriage in accordance with the contour conformity to the form on the finished work piece, said means including a templet rail extending longitudinally along the bed frame presenting a track surface in contour conformity with the desired shape contour of a face of the finished article, and guide means associated with said shaping rollers having guiding contact with said track surface.

4. An improved machine for the contour shaping of elongated articles including in combination, a bed frame, a chuck assembly for detachably supporting a work piece in fixed operative position, a traveling carriage movable along the bed frame, driving means for moving the carriage along the bed frame, said carriage having paired shaping wheels rotatably mounted on said carriage, means for resiliently pressing said shaping wheels into shaping engagement with the opposite paired faces of the work piece extending therebetween, a pair of templet rails extending longitudinally along the bed frame presenting track surfaces in contour conformity with the shape contour of the opposite faces of the finished work piece, and guide means associated with said shaping wheels having guiding contact with said track surfaces.

5. An improved machine for the contour shaping of elongated work pieces including in combination, a bed frame, a chuck assembly for detachably supporting a work piece in fixed operative position, a traveling carriage movable along the bed frame, driving means for reciprocating the carriage along the bed frame, said carriage having paired shaping cutters rotatably mounted on said carriage, means for resiliently pressing said shaping cutters into shaping engagement with the opposite paired faces of the work piece extending therebetween, a pair of pinch rolls positioned adjacent said shaping cutters for resiliently clamping the work piece therebetween, a pair of templet rails extending longitudinally along the bed frame presenting track surfaces in contour conformity with the shape contour of the opposite faces of the finished work piece, and guide means associated with said shaping cutters having guiding contact with said track surfaces.

6. An improved machine for the contour shaping of elongated work pieces including in combination, a bed frame, a chuck assembly for detachably supporting the work piece in operative position, a traveling carriage movable along the bed frame, driving means for reciprocating the carriage along the bed frame, said carriage having paired shaping cutters rotatably mounted on said carriage, means for resiliently pressing said shaping cutters into shaping engagement with the oposite paired faces of the work piece extending therebetween, means for automatically separating said paired shaping cutters upon completion of the advance shaping stroke, and means for releasably retaining said shaping cutters in spaced relation to the work piece during the return travel of said carriage.

7. An improved machine for the contour shaping of elongated articles including in combination, a bed frame, a chuck assembly for detachably supporting the work piece in fixed operative position, a traveling carriage movable along the bed frame, driving means for reciprocating the carriage along the bed frame, said carriage having paired shaping wheels rotatably mounted on said carriage, means for resiliently pressing said shaping wheels into shaping engagement with the opposite paired faces of the work piece extending therebetween, means for separating said paired shaping wheels upon completion of the shaping stroke, a pivotally mounted lever having bearing lugs associated therewith positioned to engage and support said paired shaping wheels in spaced position, and resilient means for retaining said wheel supporting lever in wheel supporting position during the return travel of said carriage.

8. An improved machine for the contour shaping of elongated articles including in combination, a bed frame, a chuck assembly for detachably supporting the work piece in fixed operative position, a traveling carriage movable along the bed frame, driving means for reciprocating the carriage along the bed frame, said carriage having a pair of work piece shapers rotatably mounted on said carriage, means for resiliently pressing said work piece shapers into shaping engagement with the opposite paired faces of the work piece extending therebetween, automatic means for manipulating said work piece shapers during travel of the carriage and in accordance with the contour conformity to be formed on the work piece, a driving motor mounted on said carriage, a motor control switch supported in stationary position adjacent the head end of said bed frame, manual means adjacent the head end of said bed frame for manipulating said control switch, and means associated with said traveling carriage for automatically manipulating said control switch to halt the driving motor when said carriage has completed its shaping stroke.

9. An improved machine for the contour shaping of elongated articles including in combination, a bed frame, a chuck assembly for detachably supporting the work piece in fixed operative position, a traveling carriage movable along the bed frame, driving means for reciprocating the carriage along the bed frame, said carriage having work piece shapers rotatably mounted on said carriage, means for rotating said work piece shapers, a pair of pinch rolls adjacent said shaping wheels rotatably supported by said carriage, means for resiliently clamping the work piece between said pinch rolls, and means for separating said pinch rolls when the carriage has returned to the head end of the machine.

10. An improved machine for the contour shaping of elongated articles including in combination, a bed frame, a chuck assembly for detachably supporting the work piece in fixed operative position, a traveling carriage movable along the bed frame, driving means for reciprocating the carriage along the bed frame, said carriage having work piece shapers rotatably mounted on said carriage, means for rotating said work piece shapers, a pair of pinch rolls adjacent said shaping wheels supported by said carriage, means for resiliently clamping the work piece between said pinch rolls, rocker shoes pivotally mounted on said carriage, toggle links operatively connecting said rocker shoes to said pinch rolls, and means for rocking said rocker shoes to separate said pinch rolls when the carriage has returned to the head end of the machine.

11. An improved machine for the contour shaping of elongated articles including in combination, a bed frame, a chuck assembly for detachably supporting the work piece in fixed operative position, a traveling carriage movable along the bed frame, work piece shapers mounted on said carriage, and driving means for reciprocating the carriage along the bed frame, said driving means including a traction roller rotatably mounted on said carriage positioned to have driving engagement with an advance traction track extending longitudinally along said bed frame, a second traction roller rotatably mounted on said carriage positioned to have driving engagement with a return traction track extending longitudinally of said bed frame, and automatic means adjacent the head end of the bed frame and the tail end of the bed frame for alternately shifting said advance traction roller and said return traction roller into driving engagement with its corresponding traction track.

12. An improved machine for the contour shaping of elongated articles including in combination, a bed frame, a chuck assembly for detachably supporting the work piece in fixed operative position, a traveling carriage movable along the bed frame, work piece shapers mounted on said carriage, and driving means for reciprocating the carriage along the bed frame, said driving means including a traction roller rotatably mounted on said carriage positioned to have driving engagement with an advance traction track extending longitudinally along said bed frame, a second traction roller rotatably mounted on said carriage positioned to have driving engagement with the return traction tract extending longitudinally of said bed frame, automatic means adjacent the head end of the bed frame and the tail end of the bed frame for alternately shifting said advance traction roller and said return traction roller into driving engagement with its corresponding traction track, and means adjacent the head end of the bed frame for releasably retaining said traction rollers in inoperative position during residence of the carriage at the head end of the track.

13. An improved machine for the contour shaping of elongated articles including in combination, a bed frame, a chuck assembly for detachably supporting the work piece in fixed operative position, a traveling carriage movable along the bed frame, work piece shapers mounted on said carriage, and driving means for reciprocating the carriage along the bed frame, said driving means including a motor mounted on the carriage, a traction roller rotatably mounted on said carriage positioned to have driving engagement with an advance traction track extending longitudinally along said bed frame, a second traction roller rotatably mounted on said carriage to have driving engagement with the return traction track extending longitudinally of said bed frame, automatic means adjacent the head end of the bed frame and the tail end of the bed frame for alternately shifting said advance traction roller and said return traction roller into driving engagement with its corresponding traction track, means adjacent the head end of the bed frame for releasably retaining said traction tracks in inoperative position during residence of the carriage at the head end of the track, and driving means for operatively connecting said driving motor to said traction rollers.

14. An improved machine for the contour shaping of elongated articles including in combination, a bed frame, a chuck assembly for detachably supporting the work piece in fixed operative position, a traveling carriage movable along the bed frame, driving means for reciprocating the carriage along the bed frame, work piece shapers rotatably mounted on said carriage, a carriage housing enclosing said work piece shapers, means for projecting a cooling spray, said spray means including a sprinkler device for directing the cooling water spray adjacent the work area, a supply conduit for supplying cooling liquid to said spray device, a sump well associated with said carriage housing, and means for removing the used cooling liquid therefrom.

15. An improved machine for the contour shaping of elongated articles including in combination, a bed frame, a chuck assembly for detachably supporting the work piece in fixed operative position, a traveling carriage movable along the bed frame, driving means for reciprocating the carriage along the bed frame, work piece shapers rotatably mounted on said carriage, a carriage housing enclosing said work piece shapers, means for projecting a cooling spray, said spray means including a sprinkler device for directing the cooling spray adjacent the work area, a supply conduit for supplying cooling liquid to said spray device, baffle means within said carriage housing for confining the projected spray, a sump well associated with said carriage housing, and means for removing the used cooling liquid therefrom.

ELMER WODETZKY.

REFERENCES CITED

The following references are of record in the file of this patent:

UNITED STATES PATENTS

| Number | Name | Date |
| --- | --- | --- |
| 1,619,736 | Kaufmann et al. | Mar. 1, 1927 |
| 1,864,584 | Cowdery | June 28, 1932 |
| 1,906,739 | Carruthers | May 2, 1933 |
| 1,966,869 | Owen | July 17, 1934 |
| 2,297,306 | Kousin | Sept. 29, 1942 |
| 2,323,744 | Wikle | July 6, 1943 |